United States Patent
Baret et al.

(10) Patent No.: US 11,852,079 B2
(45) Date of Patent: Dec. 26, 2023

(54) AIRCRAFT TURBOMACHINE ARRANGEMENT COMPRISING A LUBRICATION PUMP DRIVEN BY TWO OBLIQUE GEARS

(71) Applicant: SAFRAN AIRCRAFT ENGINES, Paris (FR)

(72) Inventors: Emmanuel Fabrice Marie Baret, Moissy-Cramayel (FR); Julien Fabien Patrick Becoulet, Moissy-Cramayel (FR); Franck Emmanuel Bosco, Moissy-Cramayel (FR); Michel Gilbert Roland Brault, Moissy-Cramayel (FR); Paul Ghislain Albert Levisse, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 146 days.

(21) Appl. No.: 17/624,113

(22) PCT Filed: Jun. 16, 2020

(86) PCT No.: PCT/FR2020/051028
§ 371 (c)(1),
(2) Date: Dec. 30, 2021

(87) PCT Pub. No.: WO2021/001609
PCT Pub. Date: Jan. 7, 2021

(65) Prior Publication Data
US 2022/0364517 A1    Nov. 17, 2022

(30) Foreign Application Priority Data
Jul. 3, 2019  (FR) ...................................... 1907397

(51) Int. Cl.
*F02C 7/32*      (2006.01)
*F01D 25/20*   (2006.01)
(Continued)

(52) U.S. Cl.
CPC ................ *F02C 7/32* (2013.01); *F01D 25/20* (2013.01); *F02C 7/06* (2013.01); *F02C 7/36* (2013.01);
(Continued)

(58) Field of Classification Search
CPC ...... F02C 7/32; F02C 7/06; F02C 7/36; F01D 25/20; F01D 2220/323; F01D 2260/40; F01D 2260/532
See application file for complete search history.

(56) References Cited

U.S. PATENT DOCUMENTS 4,118,997 A * 10/1978 Woodward .............. F01D 15/12
74/417
5,472,383 A * 12/1995 McKibbin ........... F16H 57/0482
184/6.12
(Continued)

OTHER PUBLICATIONS

International Search Report dated Oct. 7, 2020 in PCT/FR2020/051028 filed on Jun. 16, 2020, 2 pages.
(Continued)

*Primary Examiner* — Michael A Riegelman
(74) *Attorney, Agent, or Firm* — Oblon, McClelland, Maier & Neustadt, L.L.P.

(57) ABSTRACT

A pump that can be a gear pump that drives a rotating body of an aircraft turbine engine such as a fan shaft, is set in rotation always in the same direction, by virtue of a transmission including an oblique double gear formed by a toothed wheel on the same side as the rotating body and meshing with two pinions connected to a shaft driving the
(Continued)

pump through free-wheels with identical driving directions, whereas the pinions have opposite directions of rotation.

12 Claims, 4 Drawing Sheets

(51) Int. Cl.
 *F02C 7/06* (2006.01)
 *F02C 7/36* (2006.01)
(52) U.S. Cl.
 CPC .... *F05D 2220/323* (2013.01); *F05D 2260/40* (2013.01); *F05D 2260/98* (2013.01)

(56) References Cited

U.S. PATENT DOCUMENTS

| | | | | |
|---|---|---|---|---|
| 5,845,483 | A * | 12/1998 | Petrowicz | F02C 7/262 |
| | | | | 60/788 |
| 8,702,373 | B1 * | 4/2014 | Valva | F16H 57/0479 |
| | | | | 416/174 |
| 9,587,712 | B2 * | 3/2017 | Cho | F16H 3/66 |
| 10,895,200 | B2 * | 1/2021 | Nowakowski | F02C 7/36 |
| 11,530,617 | B2 * | 12/2022 | O'Neill | F02K 3/06 |
| 2016/0222975 | A1 | 8/2016 | Sheridan et al. | |
| 2016/0333975 | A1 * | 11/2016 | Cho | F16H 3/66 |
| 2017/0051672 | A1 * | 2/2017 | Nowakowski | F02C 7/32 |
| 2018/0045068 | A1 * | 2/2018 | Brinson | B64D 13/06 |
| 2021/0164350 | A1 * | 6/2021 | Negri | F01D 5/026 |
| 2022/0042460 | A1 * | 2/2022 | Verdier | F01D 15/12 |
| 2022/0364517 | A1 * | 11/2022 | Baret | F01D 25/20 |

OTHER PUBLICATIONS

Preliminary French Search Report dated Feb. 28, 2020 in French Patent Application No. 1907397 filed on Jul. 3, 2019 (with transaction of category of cited documents), 2 pages.

* cited by examiner

AIRCRAFT TURBOMACHINE ARRANGEMENT COMPRISING A LUBRICATION PUMP DRIVEN BY TWO OBLIQUE GEARS

The subject of the present invention is an aeronautical turbine-engine arrangement comprising a lubrication pump driven by two oblique gears.

This pump serves to inject oil into equipment to be lubricated, such as a speed reducer, situated for example between two rotating bodies, carrying blades, of the turbine engine. A particularly envisaged application, without being exclusive, is such an arrangement in a turbine engine with upstream fan, in which the reduction gear connects the fan shaft to a shaft of a low-pressure spool, and the pump is a pump of an auxiliary lubrication circuit, driven by one of these shafts.

The equipment considered here must be lubricated under all circumstances when the machine is operating to avoid damage thereto, but some particular circumstances may prevent the correct operation of the pump responsible for the lubrication. This may be the case if the rotating body driving the pump is rotating in a direction opposite to the normal direction, then driving the oil into the feed tank, while the reducing gear remains driven. This may occur under conditions of free rotation ("windmilling") of the rotating bodies of the engine, for example on the ground under the effect of wind, where the fan may rotate in the opposite direction to the normal direction.

The subject of the invention is an improvement to such arrangements, which makes it possible to maintain the lubrication of the equipment even in the case of reversal of the direction of rotation of the rotating body that drives the pump.

The means more especially constituting the invention make it possible to propose a simple and compact arrangement, avoiding in particular having to duplicate the pump or other constituents of the arrangement to make it suitable for supplying the equipment whatever the direction of rotation of the rotating body. The arrangement also comprises a single pump, driven by a single transmission, provided solely with a mechanism absorbing the reversals of direction of driving, so that the movement exerted on the pump is always in the same direction. Another advantage is that a great freedom of installation of the arrangement in the often very small free space of the turbine engine is made possible.

In a general form, the invention thus relates to an arrangement of an aeronautical turbine engine comprising a body rotating about an axis and carrying blades, equipment to be lubricated and a circuit for lubricating the equipment comprising a pump, and a drive transmission connecting the rotating body of the turbine engine to the pump, characterised in that the transmission comprises a first rotating shaft connected to the pump, two pinions with rotation axes parallel to the first shaft, and connected to the first shaft by two free-wheels with identical directions of sliding rotation, and a toothed wheel meshing with each of the pinions forming two oblique gears and driven by a second rotating shaft, connected to the rotating body by a transmission.

The only portion of the arrangement that is therefore duplicated is the pinion provided with a free-wheel, all the rest of the transmission being active in both directions of rotation of the rotating body.

The second rotating shaft can form any angle with the axis of the rotating body. This angle will often by a right angle or close to a right angle, but it can be any angle, including zero.

A configuration wherein the invention can particularly be applied is characterised in that the equipment is a rotation-speed reducer, the reducer being placed between the fan and a low-pressure spool of the turbine engine, and the rotating body driving the pump is the fan body.

According to certain optional and advantageous features of the invention:
  the pinions are both carried by the first shaft, and therefore coaxial with it, by means of the free-wheels;
  the equipment is a rotation-speed reducer, and the lubrication circuit also comprises a feed oil tank, and a lubrication pipe originating at the oil tank, extending as far as the equipment, and which passes through the pump;
  the angles of the oblique gears are both right angles;
  the pump is adjacent to a rolling bearing serving as a support for a shaft carrying teeth connected to gears driving the pump;
  the pinions are conical, and the toothed wheel also has a conical set of teeth;
  the rotating body carries a set of teeth connected to the second shaft by a single gear;
  the arrangement comprises a cover enveloping the pinion and said toothed wheel, the cover being provided with two bearings supporting the first shaft and a bearing supporting the second shaft.

Another general aspect of the invention relates to the possibilities of arrangement offered by the transmission device comprising the second rotating shaft, driving the toothed wheel and advantageously extending as far as the set of teeth belonging to the rotating drive body. This second shaft may be perpendicular to the axis of the rotating body, which makes it possible to offset the pump arrangement by any distance in the radial direction of the turbine engine; it may also be inclined in the direction of the axis of the rotating body, which also makes it possible to offset the arrangement by any axial distance in the turbine engine.

It thus becomes possible to place the arrangement to the best of the possibilities of instalment in the empty spaces close to the equipment to be lubricated. One advantageous possibility may, as has been seen, consist in making the arrangement adjacent to a rolling bearing itself adjacent to the equipment; another advantageous possibility consists in making the arrangement adjacent to the oil tank to reduce or eliminate operations of the pump when empty; it is even possible to make the pump internal to the oil tank.

Another aspect of the invention is a turbine engine comprising equipment according to the above.

The various aspects, features and advantages of the invention will now be described in more detail by means of the following figures, which illustrate a preferred embodiment thereof, given purely for illustration:

Figure 1:
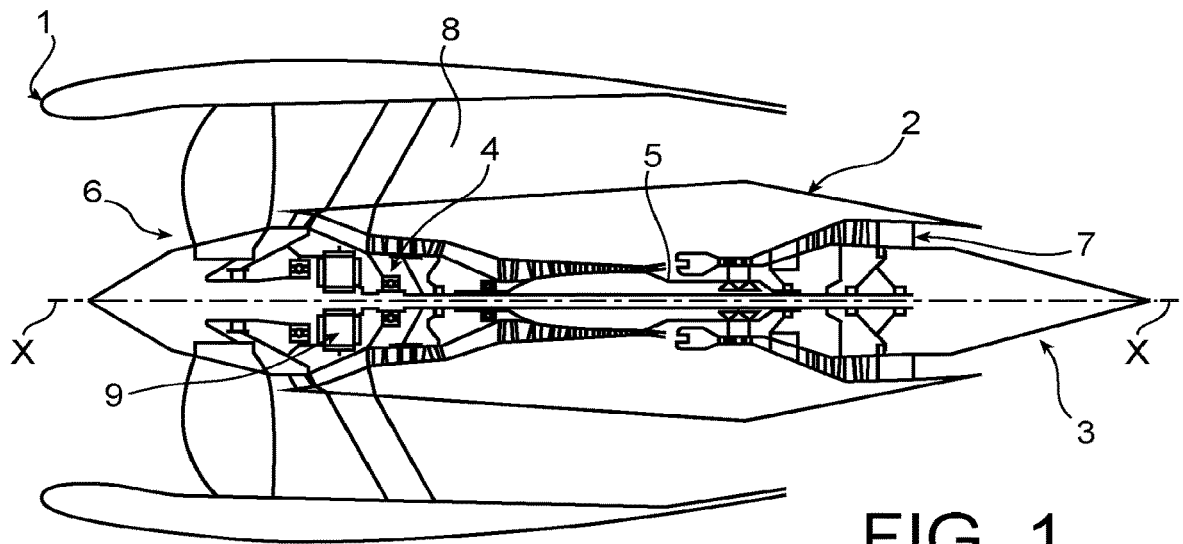
FIG. 1 is a general view of a turbine engine, indicating a possible position of the invention.

Reference is made to FIG. 1.

A turbine engine comprises, in an annular nacelle 1, a stator 2, also annular, and a rotor 3 rotating in a central recess of the stator 2, this rotor 3 comprising a low-pressure spool 4 and a high-pressure spool 5, both concentric. The axis about which the rotor 3, and all the rotating bodies, including the fan 6, that make it up, are referenced by X-X. The low-pressure spool 4 is extended by a fan 6 upstream of the turbine engine and of the flow of the gases that pass through it. The turbine engine comprises compressors, a combustion chamber and turbines, which are conventional elements that will not be dealt with again, downstream of the fan 6. The embodiment shown comprises a main primary stream 7, extending around the rotor 3 and surrounded by the stator 2, and a secondary stream 8 surrounding the stator 2 and surrounded by the nacelle 1, and the fan 6 extends in front of the primary stream 7 and in front of the secondary stream 8; but this configuration is not necessary for implementing the invention.

Figure 2:
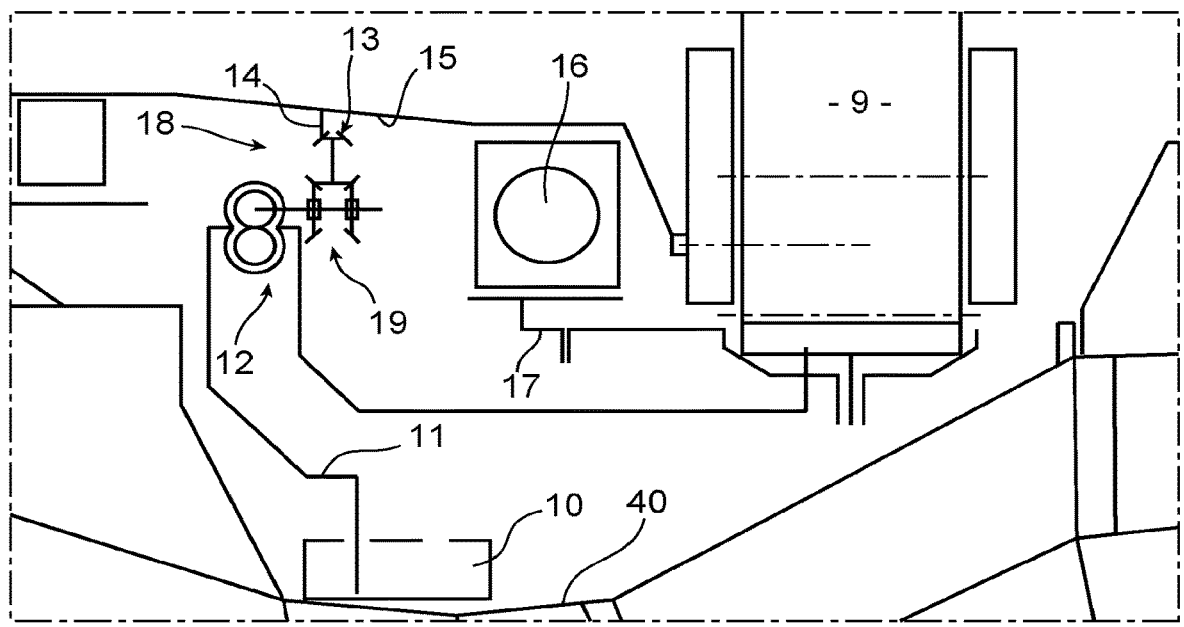
FIG. 2 shows an embodiment of the invention in general.

A speed reducer 9 connects the rotations of the low-pressure spool 4 to those of the fan 6, and must be permanently lubricated as soon as it is no longer at rest. There is therefore a lubrication circuit, shown in summary in FIG. 2, and which comprises a feed oil tank 10, a lubrication pipe 11 originating in the oil tank 10, extending as far as the reducer 9 and comprising a pump 12, which it passes through, responsible for providing the circulation of the oil to the reducer 9. The oil tank 10 is advantageously placed below the reducer 9 (at a normal orientation of the turbine engine) in a casing 40 of the turbine engine secured to the stator 17. This arrangement enables the oil to be directed from the reducer 9 to the oil tank 10 by force of gravity and then to be returned to the reducer 9 by the device according to the invention as soon as the fan 6 is no longer at rest. The lubrication is thus continuously assured. The pump 12 is a gear pump. It is driven by external gears 13 from a set of teeth 14 dependent on a fan shaft 15, driven by the fan 6 and connected to the reducer 9. The external gear 13 is preferably the only one between the fan shaft 15 and a second shaft 28 described below. The low-pressure spool 4 is also connected to the reducer 9. The pump 12 may be adjacent to a rolling bearing 16 serving to support the fan shaft 15 through a cylindrical surface 17 of the stator 2, without this being essential.

Figure 3:
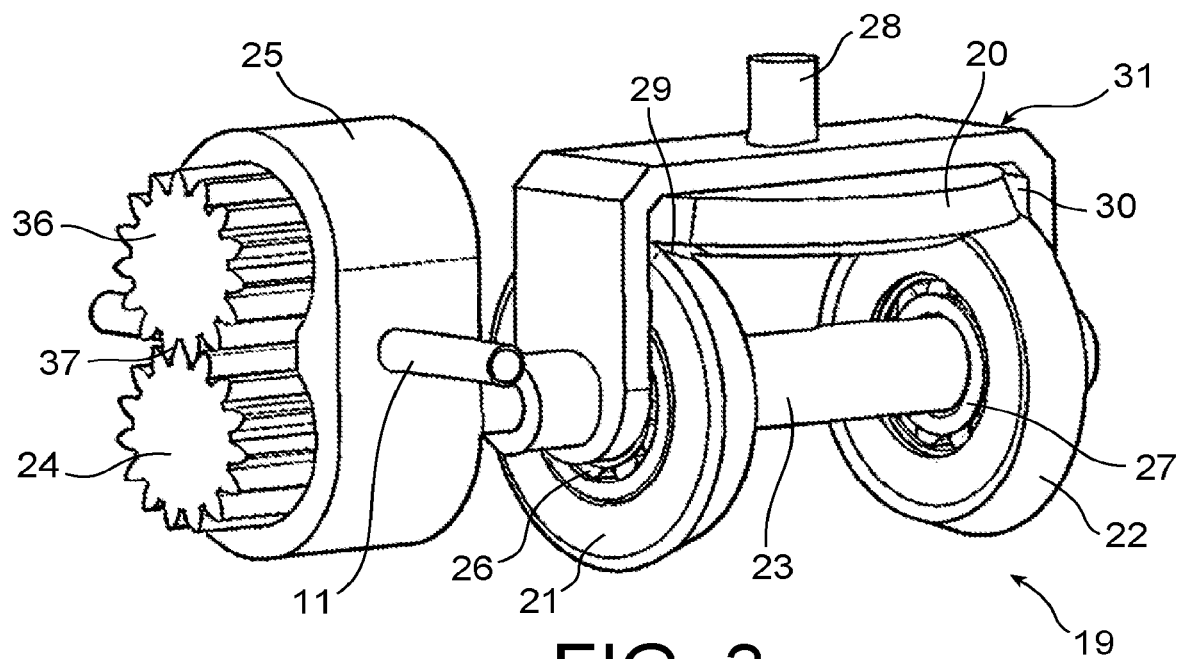
FIG. 3 is a detail view of the end of the arrangement and of the pump.
Figure 4:
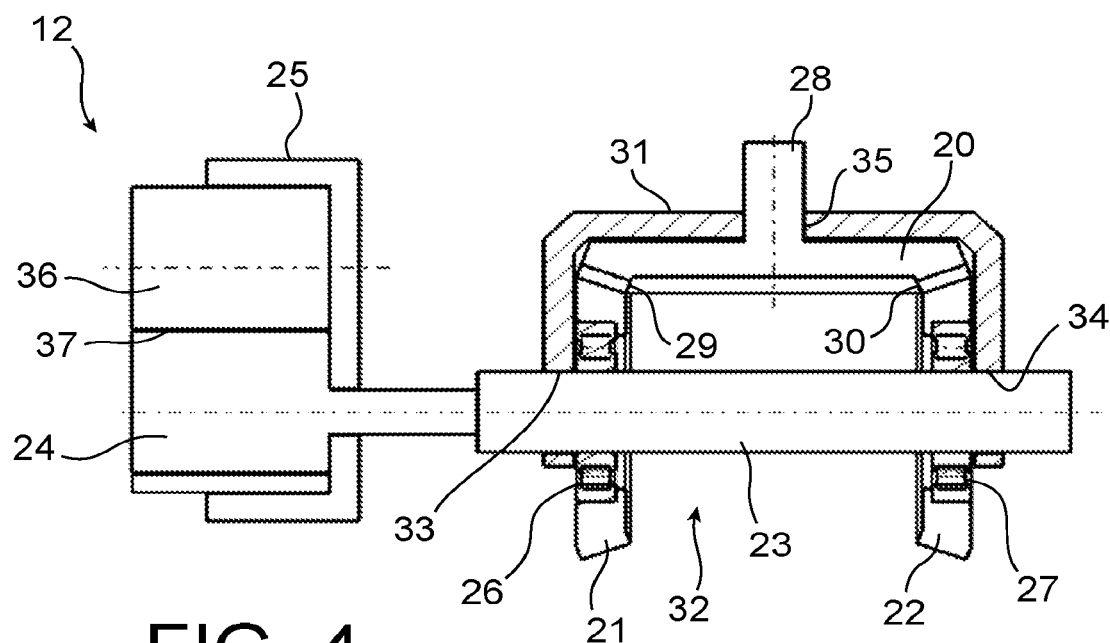
FIG. 4 is a cross section through said portion.

The transmission 18 for driving the pump 12 from the teeth 14 also comprises a double gear 19 that will be described by means of FIG. 3.

This double gear 19 comprises a toothed wheel 20 meshing through two opposite sets of teeth with two pinions 21 and 22 that are coaxial along a shaft, referred to as first shaft 23, for driving the pump 12 and more precisely a leading pinion 24 situated inside a casing 25 of the pump 12. The pinions 21 and 22 are identical and supported by the first shaft 23 by means of free-wheels, respectively 26 and 27, the directions of sliding rotation of which are identical. The toothed wheel 20 is connected to the external gear 13 by the second shaft 28, which drives it. The first shaft 23 and the second shaft 28 are perpendicular, and the pinions 21 and 22, as well as the toothed wheel 20, have conical sets of teeth and form right-angled gears 29 and 30. The gears 29 and 30 could be replaced by other right-angled gears, with other forms of sets of teeth. The assembly is supported by a cover 31 that contains the toothed wheel 20 and the pinions 21 and 22 in its central space 32, and supports the first shaft 23 through bearings 33 and 34, and the second shaft 28 by a bearing 35, these bearings being able to be plain bearings with anti-wear coating for example. The cover 31 and the casing 25 are attached to the stator of the turbine engine by means that are not shown.

As the directions of sliding rotation of the free-wheels 26 and 27 are identical, it can be seen that the first shaft 23 is driven in one direction by the gear 29 when the second shaft 28 and the toothed wheel 20 rotate in one direction, and that it is driven in the same direction by the other gear 30 when the second shaft 28 and the toothed wheel 20 rotate in the opposite direction. The directions of the movements of the leading pinion 24 and of the other pinion 36 inside the pump 12 are therefore always identical, and the oil is always driven in the same direction through the pipe 11, which emerges inside the casing 25 in front of the gear 37 formed by these two pinions 24 and 36. It can therefore be seen that the device is extremely simple and compact, and that it involves the duplication of an extremely small number of parts to ensure the permanence of the flow of oil in the correct direction, whatever the direction of rotation of the rotating body that drives the pump 12, here the fan shaft 15. The selection of the conical sets of teeth for the toothed wheel 20 and the pinions 21 and 22 increases the robustness and compactness of the device.

Figure 5:
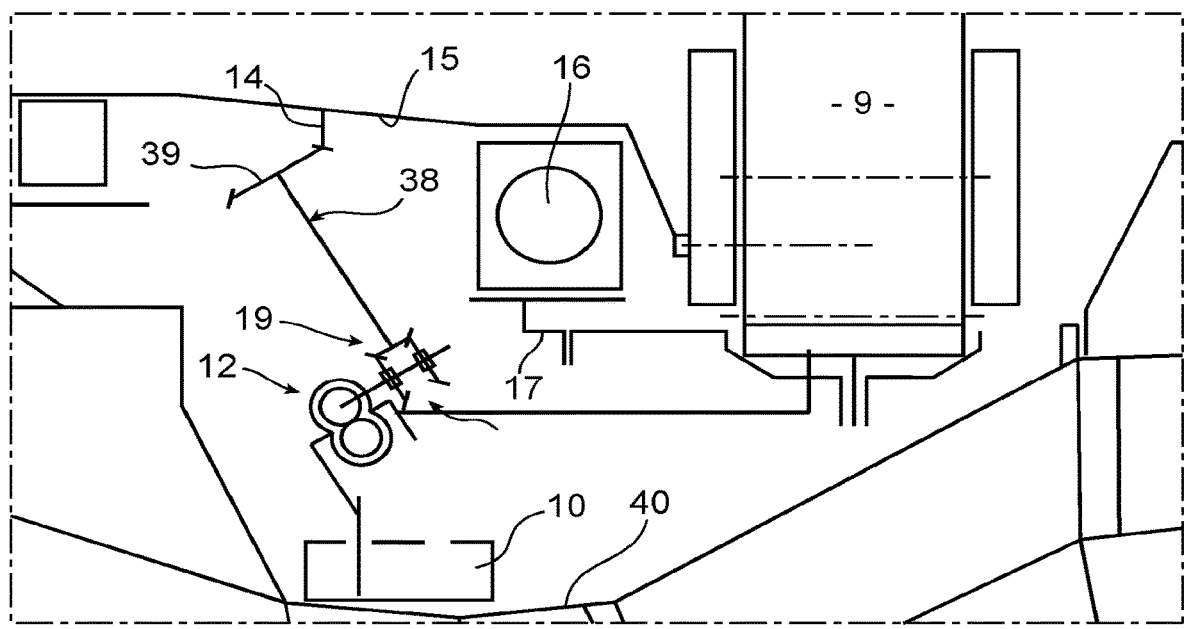
FIG. 5 is a second embodiment of the invention.

FIG. 5 illustrates another possible embodiment of the invention. In the previous embodiment, the second shaft 28 was a shaft extending in the radial direction of the turbine engine and of short length, in order to place the arrangement comprising mainly the pump 12 and the double gear 19 close to the roller bearing 16. This is not necessarily advantageous, and the shaft 28 could be replaced by a shaft 38 with an oblique direction, and therefore provided with an inclination in the direction of the axis X-X, which would make it possible also to offset the pump 12 in the axial direction, with the immediately visible advantage that the lubrication pipe connecting the oil tank 10 to the reducer 9 would be shortened. In the embodiment shown here, the pump 12 is at an intermediate radius to the oil tank 10 on the one hand, and the rolling bearing 16 and the reducer 9 on the other hand, and its axial position, offset towards the rear of the turbine engine with respect to the previous embodiment is close to that of the oil tank 10.

Figure 6:
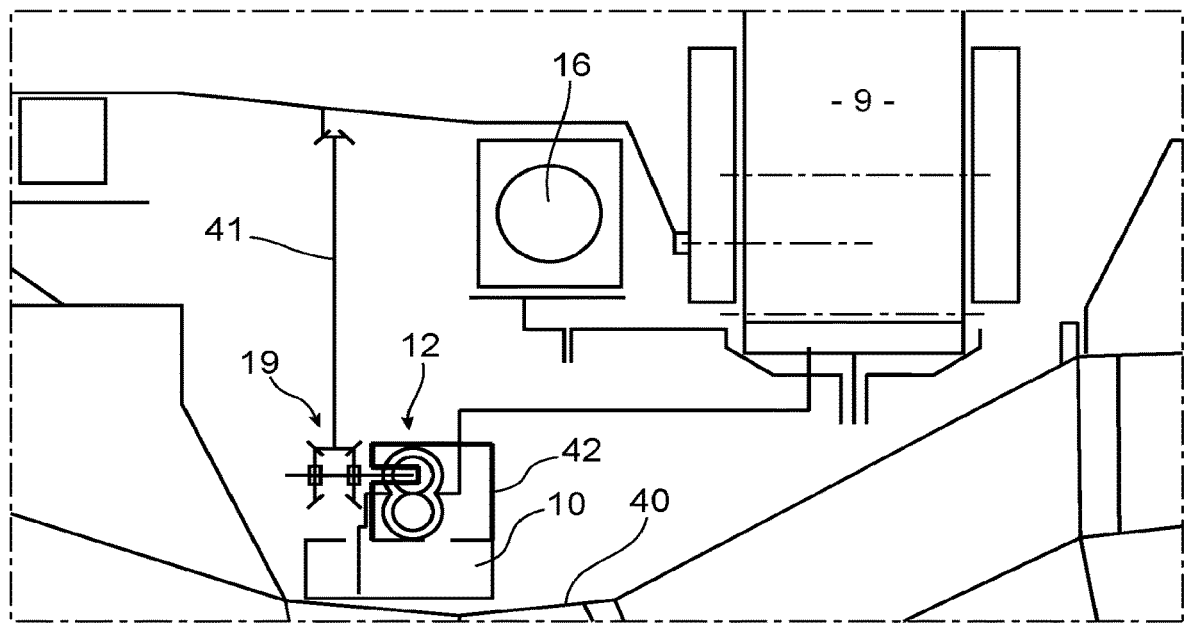
FIG. 6 is a third embodiment of the invention.

Another construction to be considered is that of FIG. 6, where the short second shaft 28 of the first embodiment and the medium-length second shaft 38 of the second embodiment are replaced by a long second shaft 41, in order to place the arrangement composed of the pump 12 and of the double gear 19 adjacent to the oil tank 10. The shaft 41 can be perpendicular or not to the axis X-X. In a variant embodiment that is shown here, it will even be possible to place the pump 12 inside the oil tank, optionally modified according to the contour 42 to be able to contain it. This arrangement makes it possible to reduce or even to omit the portion of the lubrication pipe 11 upstream of the pump 12, and therefore the periods during which the pump 12 risks working empty, if this portion of the lubrication pipe has emptied.

More generally, it is therefore possible to adjust both the length and the inclination of the shaft transmitting the movement to the double gear 19, in order to place the latter and the pump 12 at the most appropriate place. It may then become possible and advantageous to modify other surrounding arrangements relating for example to the fan 6 by using the movement of the pump 12.

A few other construction possibilities will now be explained. It is first of all not necessary for the first shaft 23, which drives the pump 12, to be directly driven by one or other of the free-wheels 26 and 27, nor for the axes of the free-wheels 26 and 27 to be aligned with each other or with the axis of the leading pinion 24: transmissions, such as speed reducers, could be added to the embodiments described up until now to adjust the rotation speed of the leading pinion 24 according to that of one or other of the free-wheels 26 and 27, or to give greater freedom of placement of the constituents of the arrangement. The placement of the first shaft 23 common with the leading pinion 24 and with each of the free-wheels 26 and 27 certainly has the advantage of simplicity.

Figure 7:
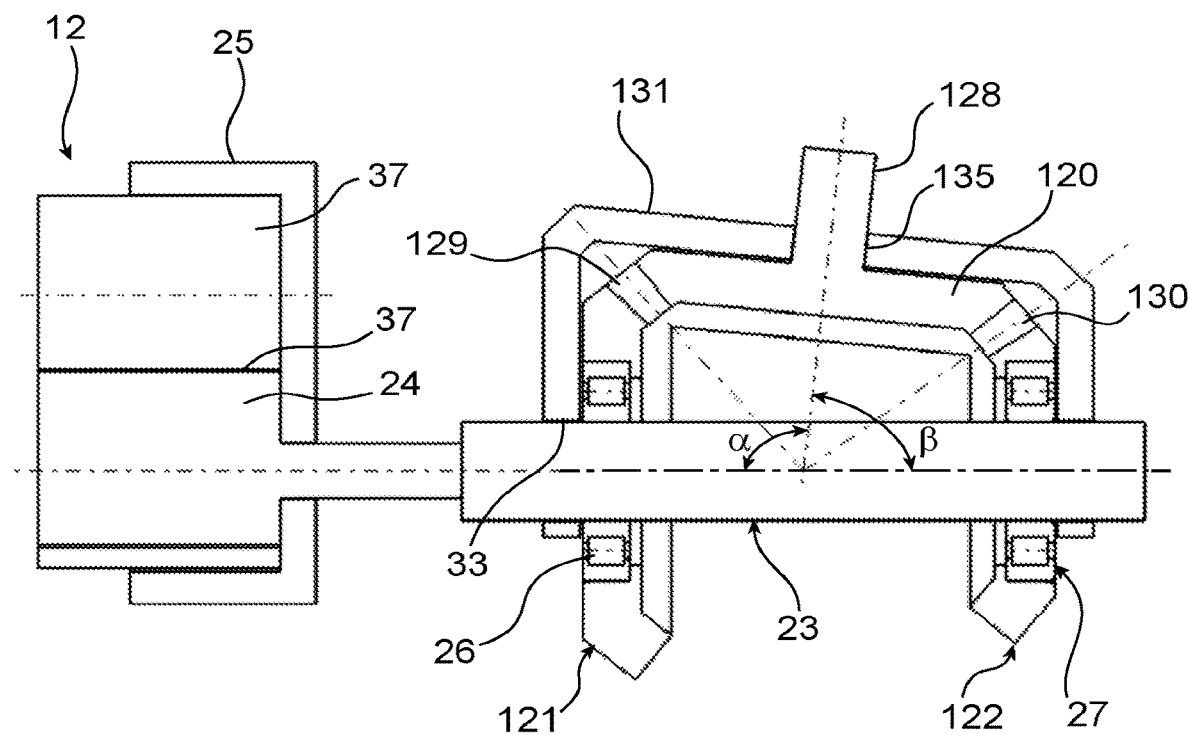
FIG. 7 is a fourth embodiment of the invention.

Another possible variant embodiment of the invention will now be dealt with, according to which the conical gears 29 and 30 at right angles are, according to FIG. 7, replaced by other conical gears 129 and 130, the $\alpha$ and $\beta$ values of which are different. The constituents modified with respect to the previous embodiments here bear the same references increased by 100. $\alpha$ and $\beta$ are also the angles between the rotation axis of the second shaft 128 and the rotation axes of the pinions 121 and 122; here, $\alpha>\beta$ and $\alpha+\beta=180°$. In this construction, the pinions, now 121 and 122, have different diameters and numbers of teeth, the toothed wheel 120 that drives them is inclined with respect to the first shaft 23 unchanged, the second shaft 128 is inclined accordingly, and the cover 131 can be modified according to these other differences in construction. The rest of the device can remain unchanged. This variant embodiment has the advantage of being able to drive the leading pinion 24 at different speeds according to that of the second shaft 128 according to the direction of rotation of the fan shaft 15, which corresponds to situations or lubrication requirements that may be different.

The invention claimed is:

1. A turbine-engine arrangement for an aeronautical turbine engine comprising a body rotating about an axis and carrying blades, the turbine-engine arrangement comprising: equipment to be lubricated, and a circuit for lubricating the equipment comprising a pump, and a drive transmission connecting the rotating body of the turbine engine to the pump,
wherein the transmission comprises a first rotating shaft connected to the pump, two pinions with rotation axes parallel to the first shaft, and connected to the first shaft by two free-wheels with identical directions of sliding rotation, and a toothed wheel meshing with each of the pinions forming two oblique gears and driven by a second rotating shaft, connected to the rotating body by a transmission.

2. The turbine-engine arrangement according to claim 1, wherein the equipment is a rotation-speed reducer, and said rotating body is a fan body of the turbine engine, the reducer being placed between the fan body and a low-pressure spool of the turbine engine.

3. The turbine-engine arrangement according to claim 1, wherein the lubrication circuit also comprises a feed oil tank and a lubrication pipe originating in the oil tank, extending as far as the equipment and which passes through the pump.

4. The turbine-engine arrangement according to claim 3, wherein the pump is adjacent to or internal to the oil tank.

5. The turbine-engine arrangement according to claim 1, wherein the pump is adjacent to a rolling bearing serving as a support for said rotating body.

6. The turbine-engine arrangement according to claim 5, wherein the rotating body carries a set of teeth connected to the second shaft by a single gear.

7. The turbine-engine arrangement according to claim 1, further comprising a cover enveloping the pinion and said toothed wheel, and provided with two bearings supporting the first shaft and with a bearing supporting the second shaft.

8. The turbine-engine arrangement according to claim 1, wherein the pinions are both carried by the first shaft, and coaxial with the first shaft, by means of the free-wheels.

9. The turbine-engine arrangement according to claim 1, wherein the oblique gears are both at a right angle.

10. The turbine-engine arrangement according to claim 1, wherein the second shaft is perpendicular to said axis of the rotating body.

11. The turbine-engine arrangement according to claim 1, wherein the second shaft is inclined in the direction of said axis of the rotating body.

12. A turbine engine, comprising an arrangement according to claim 1.

* * * * *

UNITED STATES PATENT AND TRADEMARK OFFICE
CERTIFICATE OF CORRECTION

PATENT NO. : 11,852,079 B2  
APPLICATION NO. : 17/624113  
DATED : December 26, 2023  
INVENTOR(S) : Baret et al.

Page 1 of 1

It is certified that error appears in the above-identified patent and that said Letters Patent is hereby corrected as shown below:

On the Title Page

On Page 2, Column 2, Item (56), under "OTHER PUBLICATIONS", Lines 2-3, delete "transaction" and insert -- translation --, therefor.

In the Claims

In Column 6, Claim 3, Line 10, delete "tank" and insert -- tank, --, therefor.

Signed and Sealed this  
Twenty-sixth Day of November, 2024

Katherine Kelly Vidal  
*Director of the United States Patent and Trademark Office*